United States Patent [19]

Memon

[11] 4,371,585
[45] Feb. 1, 1983

[54] PROCESS FOR APPLYING A SILICONE OR SILOXANE-BASED ABRASION RESISTANT COATING TO A POLYCARBONATE SUBSTRATE, AND COATED ARTICLES

[75] Inventor: Nazir A. Memon, Fallsington, Pa.

[73] Assignee: Rohm and Haas Company, Philadelphia, Pa.

[21] Appl. No.: 65,795

[22] Filed: Aug. 13, 1979

Related U.S. Application Data

[63] Continuation of Ser. No. 822,763, Aug. 8, 1977, abandoned.

[51] Int. Cl.$^3$ .................. A02B 1/10; A02B 1/04; B05B 1/38; B32B 27/08
[52] U.S. Cl. .................. 428/412; 427/160; 427/162; 427/163; 427/164; 427/387; 427/412.5
[58] Field of Search .................. 427/160, 387, 407.6, 427/162, 163, 164, 412.5; 428/412, 447

[56] References Cited

U.S. PATENT DOCUMENTS

| | | | |
|---|---|---|---|
| 3,582,398 | 6/1971 | Ringler | 428/412 |
| 3,594,264 | 7/1971 | Urban | 428/412 X |
| 3,707,397 | 12/1972 | Gagnon | 427/387 X |
| 3,933,407 | 1/1976 | Tu et al. | 427/387 X |
| 4,045,602 | 8/1977 | Sommer et al. | 427/387 X |
| 4,103,065 | 7/1978 | Gagnon | 427/387 X |
| 4,177,301 | 12/1979 | Smith | 428/447 X |

FOREIGN PATENT DOCUMENTS

48-81928 11/1973 Japan.

*Primary Examiner*—Shrive P. Beck
*Attorney, Agent, or Firm*—Jordan J. Driks

[57] ABSTRACT

A tie coating composition comprising a polymer or copolymer of an alkyl methacrylate and a flow improver dissolved in an organic solvent system is applied to a polycarbonate substrate prior to applying a silicone or siloxane-based abrasion resistant coating.

4 Claims, No Drawings

PROCESS FOR APPLYING A SILICONE OR SILOXANE-BASED ABRASION RESISTANT COATING TO A POLYCARBONATE SUBSTRATE, AND COATED ARTICLES

This is a continuation of application Ser. No. 822,763 filed Aug. 8, 1977 now abandoned.

BACKGROUND OF THE INVENTION

I. Description of the Prior Art

Thermoplastic and thermoset polymers can be improved as to abrasion resistance by siloxane- and silicone-based abrasion resistant coatings such as those disclosed in U.S. Pat. No. 3,986,997 to Clark, U.S. Pat. No. 3,894,881 to Suzuki et al, or U.S. Pat. No. 4,159,206.

However, such coating compositions, when applied directly to polycarbonate substrates, do not adhere adequately.

Japanese Patent Application No. 81928/73 published Nov. 1, 1973 and assigned to Toray Industries, Inc. teaches the advantage of a primer coating whose binder is a polymer of methyl methacrylate prior to applying a siloxane abrasion resistant coating, but in all cases when polymers of methyl methacrylate are used in the tie coating, the tie coating was baked on prior to applying the abrasion resistant coating.

The object of my invention is to provide a primer coating system which improves the adhesion of silicone- and siloxane-type abrasion resistant coatings to thermoplastic and thermoset substrates.

Another object is to provide a method of improving the adhesion of such coatings to such substrates.

A further object is to provide substrates having a first primer coating and a second abrasion resistant coating.

II. Summary of the Invention

These objects and others which will become apparent from the following disclosure are achieved by the present invention which comprises in one aspect a process for applying and adhering a silicone or siloxane based abrasion-resistant coating to a thermoplastic or a thermoset polycarbonate substrate comprising applying a tie coating composition comprising a polymer of an alkyl methacrylate or a copolymer polymerized from a monomer mixture comprised of at least 50 weight percent of at least one alkyl methacrylate and a flow improver dissolved in one or more organic solvents prior to applying said abrasion-resistant coating.

In another aspect the invention comprises articles produced by the above-described process.

DETAILED DESCRIPTION OF THE INVENTION AND THE PREFERRED EMBODIMENTS

The polycarbonate substrates used in this invention can be in sheet, rod, tube, shaped article, or any other form. After application of the coating, the articles are useful for flat or curved enclosures such as windows, skylights, windshields, plastic lenses, furniture, and the like. Examples of suitable polycarbonates are poly(diphenylolpropane carbonate), poly(diethylene glycol bis(allyl carbonate)), and the like.

The tie coating composition comprises a polymer of alkyl methacrylate, a flow modifier, and one or more organic solvents. The alkyl methacrylate polymer is polymerized from a monomer mixture comprised of at least 50 weight percent of at least one alkyl methacrylate. Methyl methacrylate is the preferred methacrylate, but other $C_1$ to $C_6$ alkyl methacrylates are also quite useful. Comonomers can be any copolymerizable monoethylenically unsaturated type, for example $C_1$ to $C_6$ alkyl acrylates such as ethyl acrylate, acrylic acids such as acrylic or methacrylic acid, other methacrylates such as glycidyl methacrylate, isobornyl methacrylate, etc., styrene, acrylonitrile, and the like. The methyl methacrylate polymer used can be imidized via the imide reaction with ammonia or an amine as taught in Kopchik Ser. No. 633,302 filed Nov. 19, 1975. A mixture of above polymer may also be used in the present invention.

Preferred flow modifiers include fluoroaliphatic oligomers such as those described in U.S. Pat. No. 3,787,351, for example 2-(n-butylperfluorooctanesulfonamide) ethyl acrylatepolyethylene-polypropylene glycol acrylate copolymer. Other flow modifiers suitable are commercially available silicone flow improvers used in paints such as Raybo-3 (Raybo Chemical Co.), DC-7 and DC-3 (Dow Corning Co.) and SF-1023 (General Electric Co.).

The organic solvent system can be any capable of dissolving the alkyl methacrylate polymer. Suitable systems include toluene, isopropanol, butanol, cellosolve acetate, butyl acetate, and the like. A preferred system is a mixture of toluene and isopropanol in about a 1/1 weight ratio.

The preferred weight ratio of alkyl methacrylate polymer to solvent is about 6:94 to 10:90. Slightly higher and lower ratios can also be used, depending on factors such as polymer molecular weight and composition, solvent system, and speed of application desired.

The preferred weight ratio of flow modifier to solvent is about 0.01:100 to 1:100.

In addition, 0.5 to 10 percent of a UV absorber, e.g., benzotriazole-type can be added, based on polymer weight.

The tie or primer coat is applied to the substrate by any suitable means, e.g., spraying, brushing, dipping, spinning, etc., followed by air drying at room temperature for 5–20 minutes depending on the solvent system. Room temperature is about 20°–30° C.

Next, the abrasion resistant coating is applied by any suitable means, e.g., those means mentioned for the tie coat, and cured at elevated temperature, preferably about 50° to 150° C.

The resultant articles are unexpectedly improved as compared to articles prepared without the tie coat.

The abrasion resistant coating has superior adhesion and abrasion resistance because of the tie coat. It is surprising that no dilute acid etching of the tie coat is necessary as it usually is when applying the same siloxane coatings directly to polymethyl methacrylate substrates.

The following non-limiting examples illustrate a few embodiments of the invention.

EXAMPLES

EXAMPLE 1

The following polymers of an alkyl methacrylate were prepared by conventional bulk molding procedures:

A. Polymethyl methacrylate, number average molecular weight of 50,000.

B. Poly(methyl methacrylate/methacrylic acid) (97.7/.3), viscosity average molecular weight of 50,000.

C. Poly(methyl methacrylate/isobutyl methacrylate/glycidyl methacrylate) (75/23/2) number average molecular weight of 50,000.

D. Poly(methyl methacrylate/ethyl acrylate) (99/1), post imidized with methyl amine to 23% $CH_3$-glutarimide functionality, according to the procedure of Kopchik, Ser. No. 633,302, of Nov. 15, 1975.

E. Poly(methyl methacrylate/butyl methacrylate/isobutyl methacrylate) (60/15/25) number average molecular weight of 50,000.

EXAMPLE 2

The following solvent systems were prepared:
A. Toluene/isopropanol (1:1)

EXAMPLE 3

A. A mixture of
33.3 parts water
0.62 parts $NaOAc.3H_2O$
50.0 parts colloidal silica, 60 millimicron
2.5 parts glacial acetic acid
46.7 parts methyl trimethoxysilane
4.8 parts dimethyl dimethoxysilane
was diluted to 20% solids with isopropanol and aged 6 days before application.

B. A coating solution was prepared in accordance with U.S. Pat. No. 3,986,977, Example VII.

EXAMPLE 4

Primer coatings were prepared by

A. Dissolving the polymer of 1A in the solvent system of system of Example 2A at a ratio of 6:94 (polymer: solvent) and adding 0.01 part 2-(N-butyl-perfluoro-octanesulfonamide) ethyl acrylate-polyethylene-polypropylene glycol acrylate copolymer as flow modifier. 7.5 percent, based on polymer, of 2-(2-hydroxy-5-t-octylphenyl)-benzotriazole was added as UV absorber.

B. Example 4A was repeated except using the polymer of Example 1B instead of 1A.

C. Example 4A was repeated except using the polymer of Example 1C.

D. Example 4A was repeated except using the polymer of Example 1D.

E. Example 4A was repeated except using (1/1) combination of polymers of Example 1A and 1C.

EXAMPLE 5

The tie coating of Examples 4A, B, C, D, and E were applied to poly(diphenylpropane carbonate) sheets and to poly(diethylene glycol bis(allyl carbonate) sheets by cascading the solutions on the sheets, air dried for ten minutes, then coated with the silicone abrasion resistant coating mixtures of Examples 3A and 3B. The silicone coating was cured for two hours at 100° C.

Clear, level, abrasion resistant coatings with excellent adhesion are obtained without the need for solvent washing of the polycarbonate substrates prior to coating. The cross-hatch tape-peel test was used to test for adhesion. The coating did not delaminate when immersed in 140° F. water for 30 days.

EXAMPLE 6

Comparative

The silicone abrasion resistant coating of Example 3A was applied to a sheet of poly(diphenyl propane carbonate) without first applying the primer-coating of the invention.

The abrasion-resistant coating had poor adhesion and scraped off with finger nail.

EXAMPLE 7

Comparative

This Example shows the importance of not baking the tie coating prior to application of the silicone abrasion coating.

The tie coating of Example 4A was applied to poly(-diphenyl propane carbonate), but rather than simply air drying for ten minutes before applying the silicone abrasion resistant coating, as in Example 5, the primer coating was baked at 100° C. for 20 minutes, and then the silicone coating of Example 3A was applied and then cured for two hours at 100° C. as in Example 5.

After two days immersion in 140° F. water, the coating delaminated.

I claim:

1. A process for applying and adhering a silicone or siloxane based abrasion-resistant coating to a polycarbonate substrate comprising applying a tie coating composition comprising a thermoplastic polymer of an alkyl methacrylate or a thermoplastic copolymer polymerized from a monomer mixture consisting essentially of at least 50 weight percent of at least one alkyl methacrylate or a mixture of such polymers and a flow improver dissolved in one or more organic solvents and drying at a temperature of about 20° to 30° C. prior to applying said abrasion-resistant coating.

2. Articles produced by a process of claim 1.

3. Process in accordance with claim 1 wherein said tie coating composition further comprises a UV absorber.

4. Articles produced by the process of claim 3.

* * * * *